(12) United States Patent
Chen et al.

(10) Patent No.: US 7,284,886 B2
(45) Date of Patent: Oct. 23, 2007

(54) MOONROOF FOR A MOTOR VEHICLE

(75) Inventors: Pao Chen, Milpitas, CA (US); Rosario Daniel, Santa Cruz, CA (US); Markey Charles, San Francisco, CA (US); Arne Stoschek, Palo Alto, CA (US)

(73) Assignee: Volkswagen AG, Wolfsburg (DE)

( * ) Notice: Subject to any disclaimer, the term of this patent is extended or adjusted under 35 U.S.C. 154(b) by 0 days.

(21) Appl. No.: 11/286,576

(22) Filed: Nov. 23, 2005

(65) Prior Publication Data

US 2007/0115673 A1    May 24, 2007

(51) Int. Cl.
*B60Q 1/00* (2006.01)

(52) U.S. Cl. .................. 362/488; 362/490; 362/610; 362/627; 362/84; 362/628

(58) Field of Classification Search ............... 362/490, 362/479, 601, 605, 609, 610, 84, 488, 619, 362/627, 628
See application file for complete search history.

(56) References Cited

U.S. PATENT DOCUMENTS

| | | | | |
|---|---|---|---|---|
| 5,101,325 A | * | 3/1992 | Davenport et al. | 362/628 |
| 6,152,569 A | * | 11/2000 | Aizawa | 362/27 |
| 6,240,664 B1 | * | 6/2001 | Hjaltason | 40/546 |
| 6,331,065 B1 | * | 12/2001 | Wilms | 362/493 |
| 6,666,571 B2 | | 12/2003 | Becher et al. | |
| 6,742,907 B2 | * | 6/2004 | Funamoto et al. | 362/625 |
| 6,890,089 B2 | | 5/2005 | Haering et al. | |
| 7,118,239 B2 | * | 10/2006 | Itoh et al. | 362/84 |
| 2002/0167820 A1 | * | 11/2002 | Haering et al. | 362/551 |
| 2002/0172039 A1 | * | 11/2002 | Inditsky | 362/231 |
| 2005/0073851 A1 | * | 4/2005 | Itoh et al. | 362/487 |
| 2005/0128760 A1 | * | 6/2005 | Moser | 362/488 |

FOREIGN PATENT DOCUMENTS

| | | |
|---|---|---|
| DE | 198 50 371 A1 | 5/2000 |
| DE | 101 23 263 A1 | 11/2002 |
| DE | 101 34 641 A1 | 5/2003 |
| DE | 103 43 778 A1 | 5/2004 |
| DE | 102 59 828 A1 | 7/2004 |
| DE | 103 13 067 A1 | 10/2004 |
| DE | 103 13 068 A1 | 12/2004 |
| DE | 103 41 409 A1 | 4/2005 |
| DE | 102 04 359 B4 | 5/2005 |
| DE | 10 2004 007 555 A1 | 9/2005 |
| GB | 2 343 214 A | 5/2000 |
| WO | 2005/028251 A1 | 3/2005 |

* cited by examiner

Primary Examiner—Thomas M. Sember

(57) ABSTRACT

The invention relates to a moonroof for a motor vehicle, the moonroof comprising a transparent wedge-shaped essentially solid body having a surface that is to be turned toward an interior space of a motor vehicle, and having a surface opposite the surface that is to be turned toward the interior space of the motor vehicle, the surface that is to be turned toward the interior space of the motor vehicle being inclined to the surface opposite the surface to be turned toward the interior space of the motor vehicle and the moonroof comprising a light source for introducing light into the transparent wedge-shaped essentially solid body.

21 Claims, 3 Drawing Sheets

MOONROOF FOR A MOTOR VEHICLE

BACKGROUND OF THE INVENTION

The invention relates to a moonroof for a motor vehicle. The invention also relates to a motor vehicle having a moonroof.

DE 103 13 067 A1 discloses a vehicle roof having an adjustable, nontransparent cover for optionally closing or at least partially clearing a roof opening, the cover having a cover plate, and there being fastened on the underside of the cover plate a plate arrangement that is designed at least over a portion of its surface as a luminous area that has an electroluminescent layer.

DE 198 50 371 A1 discloses a vehicle roof structure having an at least partially transparent pane that is inserted into a roof cut-out on the side of the vehicle interior space and whose transparency can be varied, the outer side of the roof cut-out being covered by an outer pane embodied in particular by safety glass, at least one electric light source being provided in the space between the outer pane and the variably transparent pane.

DE 103 43 778 A1 discloses a glazed roof for motor vehicles having one or more light incoupling, light guiding and light outcoupling systems for lightening the vehicle interior space over a wide area, the light incoupling systems comprising at least one transparent area on the outer surface of the vehicle body for receiving the incoming light beams of ambient light, and the light guiding systems comprising at least one planar light guide in the region of the roofliner, and the light outcoupling systems being arranged in the roofliner and being embedded in the light guiding systems, or being arranged in contact therewith.

DE 101 23 263 A1 discloses a light guiding system, the light guiding system comprising a light generating unit that can be switched on and off, and a light guide for guiding light that is coupled to the light generating unit for the purpose of coupling in the light. Here, the light guide is arranged in the region of the inner cladding of the vehicle roof and designed as a planar light guide, the light being coupled in at one or more lateral surfaces of the light guide, and the planar light guide being prepared in such a way that the light from the light guide is coupled out into the interior space of the vehicle homogenously over a large area.

DE 103 41 409 A1 discloses a roofliner for the interior space of a motor vehicle, a planar light source being provided that has a plate-shaped light guide which emits toward the viewing side, runs at least in part flush with the viewing side of the cladding part, and cooperates at the end with at least one luminous means.

DE 103 13 068 A1 discloses a vehicle roof having an element for at least temporarily closing a roof opening, and a flat covering element that is displaceably arranged below the closing element in the roof plane in order at least temporarily to cover the roof opening with reference to the interior space of the vehicle, the covering element being designed at least over a portion of its surface as a luminous area, and the luminous area having an electroluminescent layer. The electroluminescent layer is embedded in this case between two plates that form the covering element.

DE 101 34 641 A1 discloses a sliding roof for a vehicle, having an adjustable cover for opening and closing the vehicle roof, an electric light source being fastened on the cover.

DE 102 59 828 A1 discloses an at least partially transparent element for a vehicle roof, having a glass pane, an electric load and an electrically conducting layer arrangement that is connected to the glass pane and has a first and second electric contact for a current source and has a first and a second connection for the load, the layer arrangement having a first and a second electrically conducting layer that are insulated from one another by a first electrically insulating layer.

DE 10 2004 007 555 A1 discloses an interior luminaire of a vehicle having a transparent roof and having at least one lens, at least one light incoupling element being provided that couples light into a lateral narrow side of the at least one lens, the at least one lens having optical refractive structures for outcoupling the light from a surface of the lens facing the interior space of the vehicle.

DE 102 04 359 B4 discloses a vehicle roof having a roof part and having a luminous panel provided below the roof part and which is formed on an underside of the roof part by the irradiation of light from an illuminating device, the roof part being at least one part of a moveable cover.

It is an object of the invention to improve the illumination of an interior space of a motor vehicle.

SUMMARY OF THE INVENTION

The abovenamed object is achieved by means of a moonroof for a motor vehicle, the moonroof comprising a transparent wedge-shaped essentially solid body having a surface that is to be turned toward an interior space of a motor vehicle, and having a surface opposite the surface that is to be turned toward the interior space of the motor vehicle, the surface that is to be turned toward the interior space of the motor vehicle being inclined to the surface opposite the surface to be turned toward the interior space of the motor vehicle, and the moonroof comprising a light source for introducing light into the transparent wedge-shaped essentially solid body. It is provided here, in particular, that the transparent wedge-shaped essentially solid body tapers with increasing distance from the light source, in particular at least up to a specific distance from the light source or in a region provided for the emission of light generated by means of the light source.

In one refinement of the invention, the light source is arranged in relation to the transparent wedge-shaped essentially solid body in such a way that light introduced by means of the light source into the transparent wedge-shaped essentially solid body substantially undergoes a total reflection at the surface opposite the surface to be turned toward the interior space of the motor vehicle, or particularly in a substantial region of this surface.

In a further refinement of the invention, the surface to be turned toward the interior space of the motor vehicle is inclined to the surface opposite the surface to be turned toward the interior space of the motor vehicle in such a way that light introduced by means of the light source into the transparent wedge-shaped essentially solid body is partially reflected at the surface to be turned toward the interior space of the motor vehicle, or particularly in a substantial region of this surface.

In a further refinement of the invention, the light source is arranged in relation to the transparent wedge-shaped essentially solid body in such a way that light introduced by means of the light source into the transparent wedge-shaped essentially solid body is partially reflected at the surface to be turned toward the interior space of the motor vehicle, or in particular in a substantial region of this surface.

In a further refinement of the invention, the moonroof comprises a diffuser layer arranged on the surface to be turned toward the interior space of the motor vehicle.

In a further refinement of the invention, the moonroof comprises a fluorescing layer arranged on the surface to be turned toward the interior space of the motor vehicle, in particular for emitting visible light when irradiated with nonvisible light or substantially nonvisible light.

In a further refinement of the invention, the light that is not visible to a substantial proportion can be emitted by means of the light source.

In the meaning of the invention, light introduced by means of the light source into the transparent wedge-shaped essentially solid body is to be understood, in particular, as a substantial proportion of light introduced by means of the light source into the transparent wedge-shaped essentially solid body.

In addition, the abovenamed object is achieved by means of a motor vehicle, the motor vehicle having a roof and a moonroof, in particular one with a wedge-shaped cross section, arranged in the roof, having a surface turned toward an interior space of the motor vehicle, and having a surface turned toward an exterior side of the motor vehicle, the surface turned toward the interior space of the motor vehicle being inclined to the surface turned toward the exterior side of the motor vehicle, and the motor vehicle comprising a light source for illuminating the interior space of the motor vehicle by introducing light into the moonroof. It is provided here, in particular, that the moonroof tapers with increasing distance from the light source, in particular at least up to a specific distance from the light source or in a region provided for the emission of light generated by means of the light source.

In a further refinement of the invention, the light source is arranged in relation to the moonroof in such a way that light introduced into the moonroof by means of the light source substantially undergoes a total reflection at the surface turned toward the exterior side of the motor vehicle, or particularly in a substantial region of this surface.

In a further refinement of the invention, the surface turned toward the interior space of the motor vehicle is inclined to the surface turned toward the exterior side of the motor vehicle in such a way that light introduced by means of the light source into the moonroof is partially reflected at the surface turned toward the interior space of the motor vehicle, or particularly in a substantial region of this surface.

In a further refinement of the invention, the light source is arranged in relation to the moonroof in such a way that light introduced by means of the light source into the moonroof is partially reflected at the surface turned toward the interior space of the motor vehicle, or particularly in a substantial region of the surface.

In a further refinement of the invention, the surface turned toward the interior space of the motor vehicle comprises a diffuser layer.

In a further refinement of the invention, the surface turned toward the interior space of the motor vehicle comprises a fluorescing layer.

In a further refinement of the invention, the surface turned toward the interior space of the motor vehicle comprises a fluorescing layer for emitting visible light when irradiated with nonvisible light or substantially nonvisible light.

In a further refinement of the invention light that is nonvisible to a substantial proportion can be emitted by means of the light source.

In a further refinement of the invention, the moonroof is designed as an essentially solid body between the surface turned toward the interior space of the motor vehicle and the surface turned toward the exterior side of the motor vehicle.

In the meaning of the invention, light introduced by means of the light source into the moonroof is to be understood, in particular, as a substantial proportion of light introduced by means of the light source into the moonroof.

A wedge-shaped refinement in the meaning of the invention can comprise a wedge-shaped configuration in the narrower sense such as is illustrated in FIG. 1, for example. A wedge-shaped refinement in the meaning of the invention can comprise a combination of wedge-shaped configurations in the narrower sense, as illustrated in FIG. 4, for example.

A motor vehicle in the meaning of the invention is, in particular, a land vehicle that can be used individually in road traffic. In particular, motor vehicles in the meaning of the invention are not limited to land vehicles having an internal combustion engine.

Further advantages and details emerge from the following description of exemplary embodiments.

DETAILED DESCRIPTION OF PREFERRED EXEMPLARY EMBODIMENTS

Figure 1:
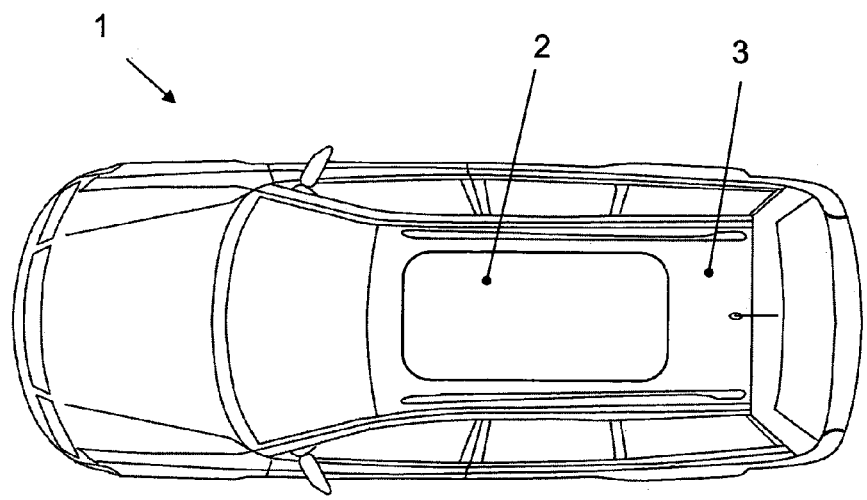
FIG. 1 shows an exemplary embodiment of a motor vehicle.
Figure 2:
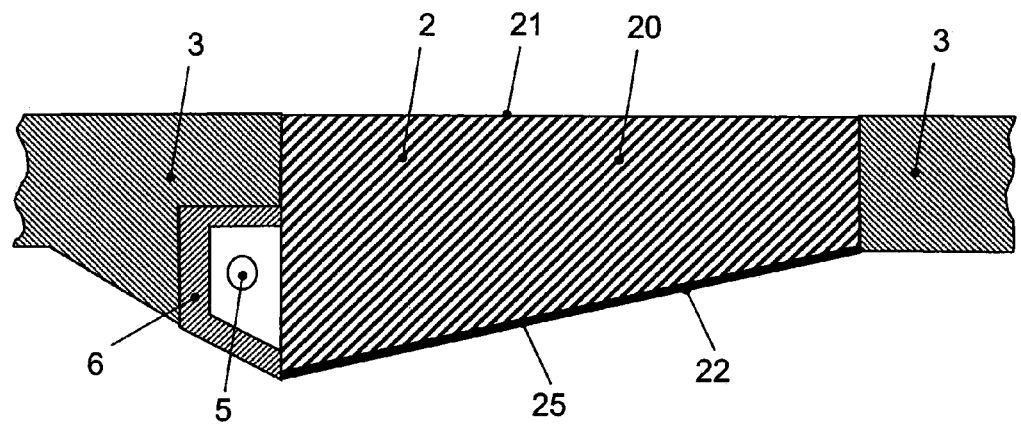
FIG. 2 shows a cross section through a roof of a motor vehicle in accordance with FIG. 1.

FIG. 1 shows an exemplary embodiment of a motor vehicle 1 having a roof 3, and having a moonroof 2 arranged in the roof 3. FIG. 2 shows a cross section, running along the longitudinal axis of the motor vehicle 1 through the roof 3 and the moonroof 2. The moonroof 2 comprises a transparent solid body 20 having a surface 22 turned toward an interior space of the motor vehicle 1, and having a surface 21 turned toward an exterior side of the motor vehicle 1. Here, the surface 22 turned toward the interior space of the motor vehicle 1 is inclined to the surface 21 turned toward the exterior side of the motor vehicle 1 in such a way that light introduced by means of a light source denoted by the reference symbol 5 into the moonroof 2 or the transparent body 20 thereof substantially undergoes total reflection at the surface 21 turned toward the exterior side of the motor vehicle 1, and is partially reflected at the surface 22 turned toward the interior space of the motor vehicle 1 such that at least a portion of this light emerges from the surface 22 turned toward the interior space of the motor vehicle 1. The light source 5 can be arranged in a housing 6 or reflector.

On the surface 22 turned toward the interior space of the motor vehicle 1, the moonroof 2 comprises a light distributor layer 25. In one refinement, the light distributor layer 25 is configured as a diffuser layer or scattering layer. In a preferred refinement, the light distributor layer 25 is configured as a fluorescing layer, in particular for emitting visible light when irradiated with nonvisible light or substantially nonvisible light. It is provided in the last refinement of the fluorescing layer for the purpose of emitting visible light when irradiated by nonvisible light or essentially nonvisible light that it is possible by means of the light source 5 to emit light that is nonvisible to a substantial proportion. The visible light can be deep ultraviolet light, ultraviolet light, near infrared light, or infrared light. The nonvisible light emitted by the light source 5 and introduced into the transparent body 20 excites the fluorescing layer to emit visible light when the nonvisible light emerges from the surface 22 turned toward the interior space of the motor vehicle 1.

The light distributor layer 25 can be, for example, laminated onto the transparent solid body 20. The transparent solid body 20 is transparent, in particular, to visible light (in particular for wavelengths between 400 nm and 700 nm), and to nonvisible light such as, for example, ultraviolet light.

Figure 3:
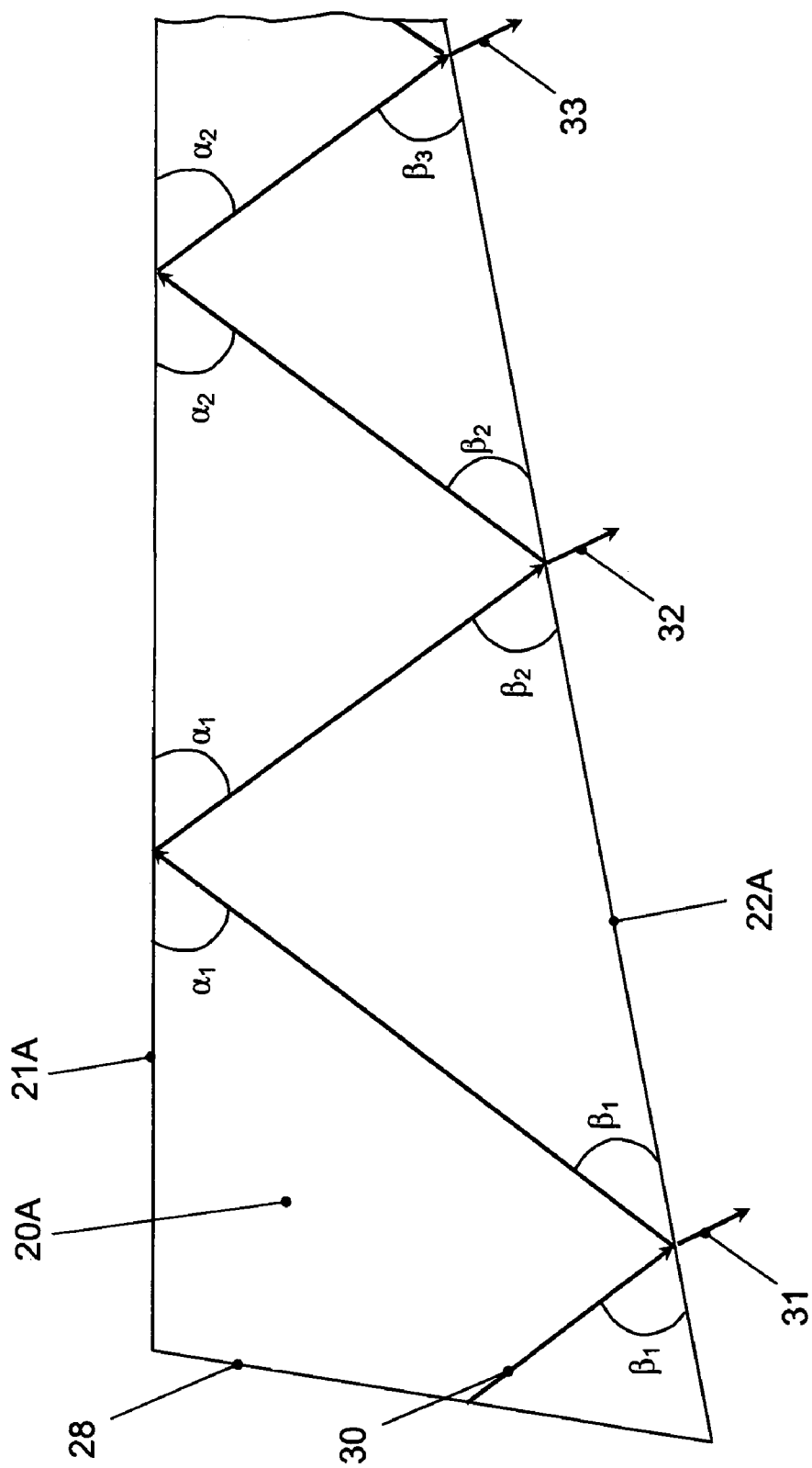
FIG. 3 shows an exemplary embodiment of a transparent body of a moonroof.

FIG. 3 shows an exemplary embodiment of a transparent body 20A as a modification of the transparent body 20. Here, the transparent body 20A differs from the transparent body 20 by having an inclined light entry surface 28. The transparent solid body 20A comprises a surface 22A turned toward the interior space of the motor vehicle 1 and corresponding to the surface 22, and a surface 21A turned toward the exterior side of the motor vehicle 1 and corresponding to the surface 21. The surface 22A turned toward the interior space of the motor vehicle 1 is inclined to the surface 21A turned toward the exterior side of the motor vehicle 1 in such a way that light 30 introduced by means of an appropriately arranged light source into the transparent body 20A is reflected at an angle $\alpha_1$ or $\alpha_2$ at the surface 21A turned toward the exterior side of the motor vehicle 1. The angles $\alpha_1$ and $\alpha_2$ can be substantially equal. The angles $90°-\alpha_1$ and $90°-\alpha_2$ are larger than the critical angle of total reflection, and so the light 30 undergoes total reflection at the surface 21A turned toward the exterior side of the motor vehicle 1.

In addition, the surface 22A turned toward the interior space of the motor vehicle 1 is inclined to the surface 21A turned toward the exterior side of the motor vehicle 1 in such a way that light introduced by means of an appropriately arranged light source into the transparent body 20A is reflected at an angle $\beta_1$ or $\beta_2$ or $\beta_3$ at the surface 22A turned toward the interior side of the motor vehicle 1. The angles $\beta_1$, $\beta_2$ and $\beta_3$ can be substantially equal. The angles $90°-\beta_1$, $90°-\beta_2$ and $90°-\beta_3$ are smaller than the critical angle of total reflection, but large enough that the light 30 is partially reflected at the surface 22A turned toward the interior side of the motor vehicle 1, but that a portion 31, 32 or 33 of this light 30 emerges from the surface 22A turned toward the interior space of the motor vehicle 1.

Figure 4:
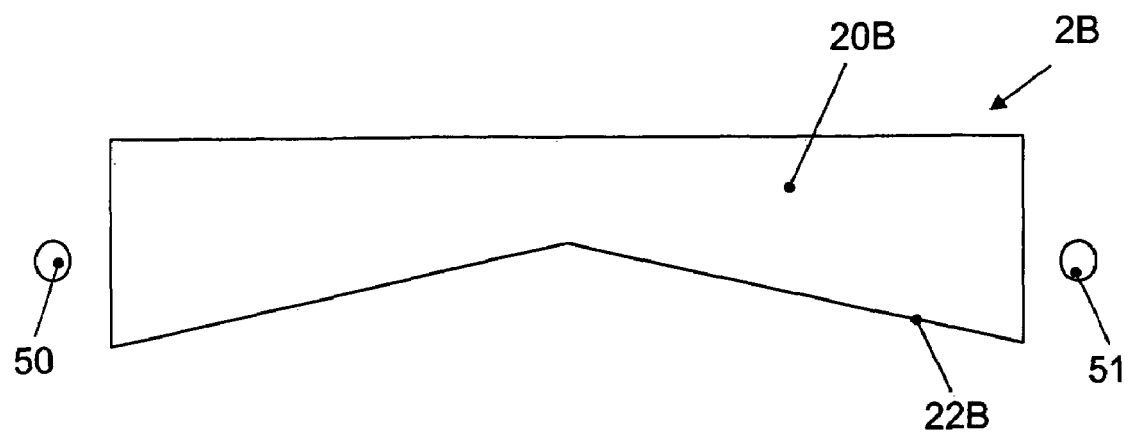
FIG. 4 shows a further exemplary embodiment of a transparent body of a moonroof.

FIG. 4 shows another exemplary embodiment of a transparent body 20B of a moonroof 2B, intended for alternative use instead of the transparent body 20. It is provided here that light enters the transparent body 20B from two sides by means of light sources 50 and 51, and exits correspondingly from a surface denoted by reference symbol 22B and turned toward the interior space of the motor vehicle 1.

The elements and layers in the figures are depicted taking account of simplicity and clarity and not necessarily in a fashion true to scale. Thus, for example, the orders of magnitude of a few elements and layers are illustrated in an exaggerated fashion in relation to other elements or layers in order to improve understanding of the exemplary embodiments of the present invention.

| List of reference symbols | |
|---|---|
| 1 | Motor vehicle |
| 2,2B | Moonroof |
| 3 | Roof |
| 5,50,51 | Light source |
| 6 | Housing |
| 20,20A,20B | Transparent solid body |
| 21,21A | Surface turned toward an exterior side of a motor vehicle |
| 22,22A,22B | Surface turned toward an interior side of a motor vehicle |
| 25 | Light distributor layer |
| 28 | Light entry surface |
| 30 | Light introduced into a transparent body |
| 31,32,33 | Portion of light introduced into a transparent body |
| $\alpha_1, \alpha_2, \beta_1, \beta_2, \beta_3$ | Angle |

The invention claimed is:

1. In combination with a motor vehicle having an interior space, a moonroof comprising:
a transparent, substantially solid, wedge-shaped body having a first surface to be turned toward the interior space of the motor vehicle, and a substantially planar second surface opposite the first surface; and
a light source for introducing light into said transparent, substantially solid, wedge-shaped body; and
wherein said first surface of said wedge-shaped body is inclined relative to said second surface of said wedge-shaped body by a given angle of inclination causing the light introduced into said wedge-shaped body to be subjected to total reflection at said second surface and to partial reflection at said first surface.

2. The moonroof according to claim 1, wherein said light source is disposed, relative to said wedge-shaped body, to cause light introduced by way of said light source into said wedge-shaped body to be partially reflected at said first surface.

3. The moonroof according to claim 1, which further comprises a diffuser layer formed directly on said first surface to be turned toward the interior space of the motor vehicle.

4. The moonroof according to claim 1, which further comprises a fluorescing layer, disposed on said first surface and configured to emit visible light upon being irradiated with nonvisible light or substantially nonvisible light.

5. The moonroof according to claim 4, wherein said light source is configured to emit the nonvisible or substantially nonvisible light.

6. The moonroof according to claim 1, wherein said first and second surfaces are substantially planar.

7. A moonroof in combination with a motor vehicle, the moonroof comprising:
a transparent, substantially solid, wedge-shaped body having a first surface to be turned toward an interior space of the motor vehicle, and a second surface opposite said first surface;
a light source for introducing light into said transparent, substantially solid, wedge-shaped body; and
a fluorescing layer disposed on said first surface to be turned toward the interior space of the motor vehicle.

8. The moonroof according to claim 7, wherein said fluorescing layer is configured to emit visible light upon being irradiated with nonvisible light or substantially nonvisible light.

9. The moonroof according to claim 8, wherein said light source is configured to emit the nonvisible or substantially nonvisible light.

10. A motor vehicle, comprising:
a roof and an interior space;
a moonroof, disposed in said roof and formed of a substantially solid body with a first surface facing toward said interior space and defining a part of an interior roof wall of the motor vehicle and with a substantially planar second surface turned toward an exterior side of the motor vehicle and defining a part of an exterior surface of the motor vehicle, said first surface of said substantially solid body being inclined relative to said second surface of said substantially solid body; and a light source for illuminating said interior space of the motor vehicle by introducing light into the moonroof.

11. The motor vehicle according to claim 10, wherein said light source is disposed relative to said moonroof to cause light introduced into said moonroof by way of said light source to undergo substantially total reflection at said second surface.

12. The motor vehicle according to claim 11, wherein said first surface is inclined relative to said second surface to cause the light introduced by way of said light source into said moonroof to be partially reflected at said first surface.

13. The motor vehicle according to claim 10, wherein said light source is disposed, relative to said moonroof, to cause light introduced by way of said light source into said moonroof to be partially reflected at said first surface.

14. The motor vehicle according to claim 10, wherein said first surface facing toward said interior space of the motor vehicle is formed with a diffuser layer.

15. The motor vehicle according to claim 10, wherein said first surface facing toward said interior space of the motor vehicle comprises a fluorescing layer for emitting visible light upon irradiation with nonvisible light or substantially nonvisible light.

16. The motor vehicle according to claim 15, wherein said light source is configured to primarily emit nonvisible light.

17. The motor vehicle according to claim 10, wherein said moonroof comprises a substantially solid body between said first surface facing toward said interior space of the motor vehicle and said second surface turned toward the exterior side of the motor vehicle.

18. The motor vehicle according to claim 10, wherein said first and second surfaces are substantially planar.

19. A motor vehicle, comprising:

a roof and an interior space;

a moonroof, disposed in said roof and having a first surface facing toward said interior space and a second surface turned toward an exterior side of the motor vehicle, said first surface being inclined relative to said second surface; and a light source for illuminating said interior space of the motor vehicle by introducing light into the moonroof; and wherein said first surface facing toward said interior space of the motor vehicle includes a fluorescing layer.

20. The moonroof according to claim 19, wherein said fluorescing layer is configured to emit visible light upon being irradiated with nonvisible light or substantially nonvisible light.

21. The moonroof according to claim 20, wherein said light source is configured to emit the nonvisible or substantially nonvisible light.

* * * * *